Figure 5:
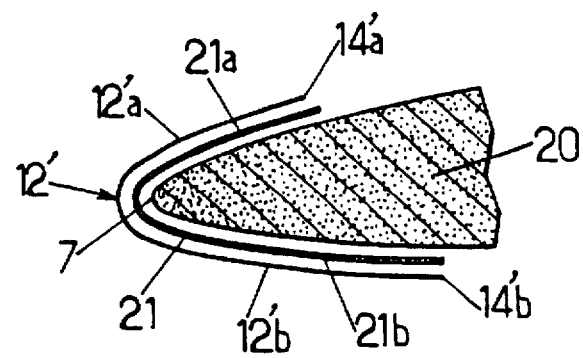

United States Patent [19]

Lorin De La Grandmaison et al.

[11] Patent Number: 5,800,129
[45] Date of Patent: Sep. 1, 1998

[54] BLADE WITH SHIELDING FOR ENHANCED PROTECTION AGAINST LIGHTNING, FOR ROTORCRAFT ROTOR

[75] Inventors: François-Marie Lorin De La Grandmaison, Aurons; Bernard Marc Tagliana, Marseille; Patrice Paul René Rauch, Fuveau, all of France

[73] Assignee: EUROCOPTER FRANCE S.A. Aeroport International Marseille-Provence, Marignane Cedex, France

[21] Appl. No.: 757,965

[22] Filed: Nov. 25, 1996

[30] Foreign Application Priority Data

Nov. 29, 1995 [FR] France ................... 95 14128

[51] Int. Cl.$^6$ .................................................. F04D 29/38
[52] U.S. Cl. ................................................................ 416/224
[58] Field of Search ..................................................... 416/224

[56] References Cited

U.S. PATENT DOCUMENTS 1,842,178  1/1932  Kempton .
3,923,421  12/1975  Carter .
4,784,575  11/1988  Nelson et al. ................. 416/224
4,944,655  7/1990   Merz ............................. 416/61
5,306,120  4/1994   Hammer et al. ............... 416/224
5,354,176  10/1994  Schilling et al. .............. 416/224
5,542,820  8/1996   Eaton et al. ................... 416/224

*Primary Examiner*—John T. Kwon
*Attorney, Agent, or Firm*—Henderson & Sturm

[57] ABSTRACT

An apparatus for shielding a blade against lightning includes a conducting leading edge glove and a conducting cap, distinct from the glove, and overlapping the blade tip across its entire chord. At least the cap has a suction face arm and a pressure face arm of different dimensions at least in the direction of its span. Mechanical devices, such as screws and rivets with protruding shapes, in addition to some glueing, fix the cap on the composite structure of the blade, and are earthed by the cap, forming points where lightning can enter or exit, protecting the surrounding composite structure of the blade against damage. When the blade is mounted on a member for linking to the hub, electrical continuity with this member and the hub is provided.

28 Claims, 5 Drawing Sheets

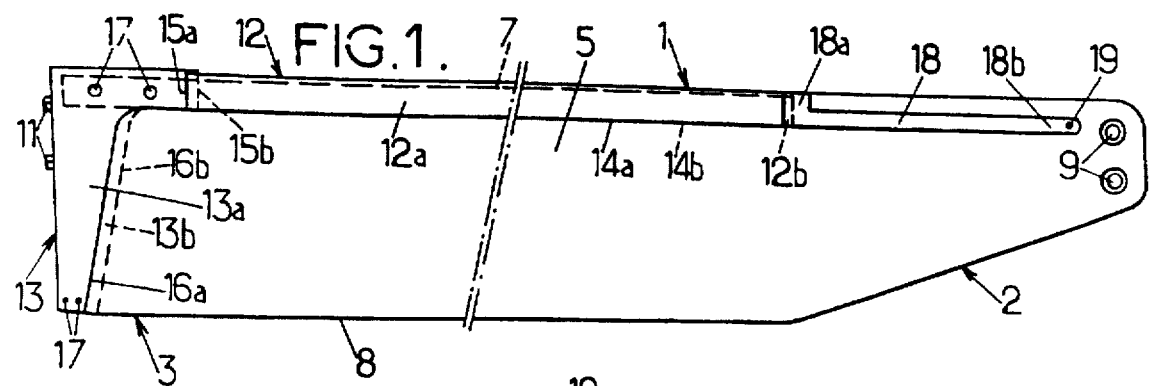
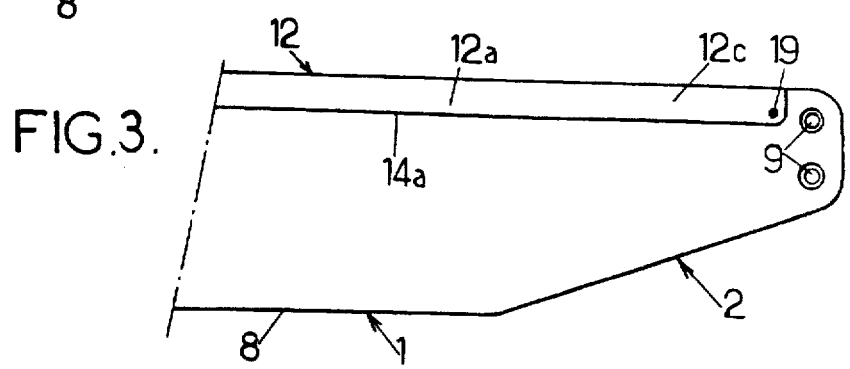
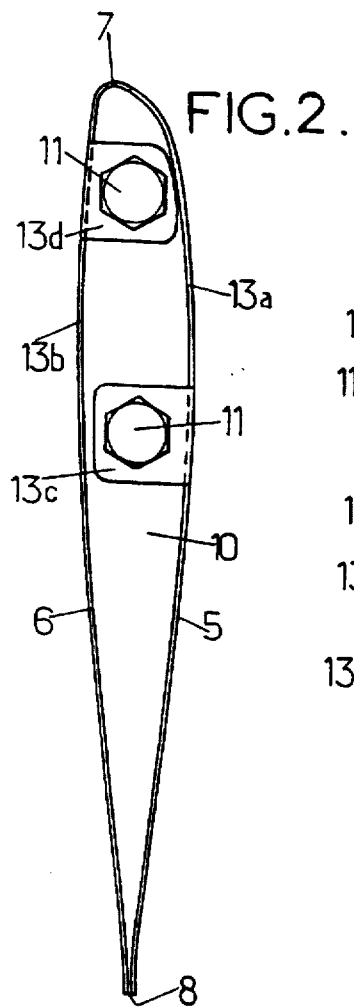
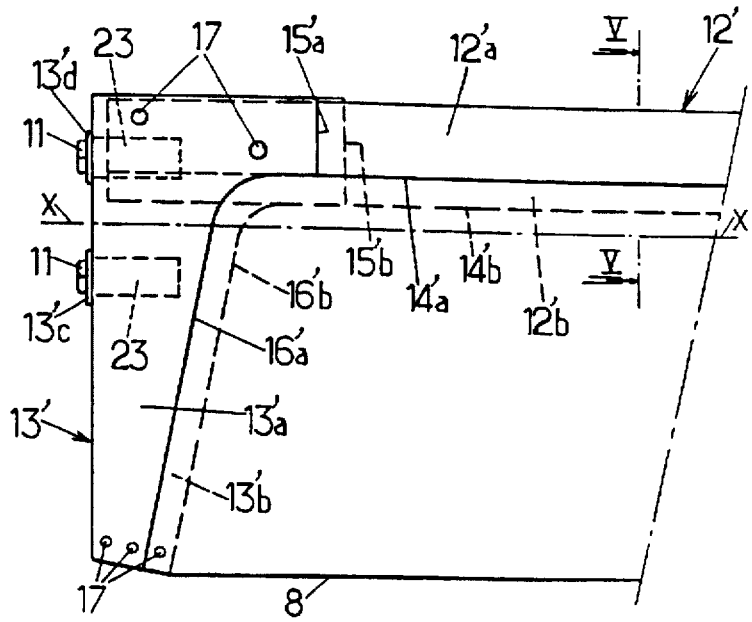

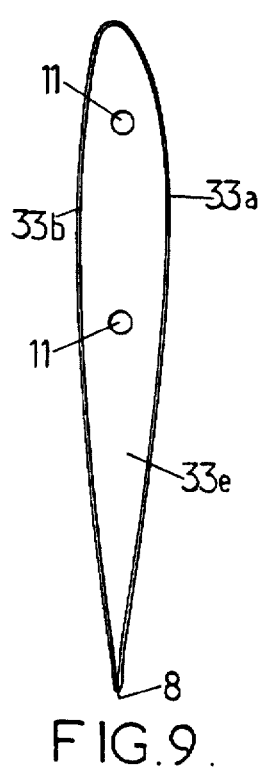
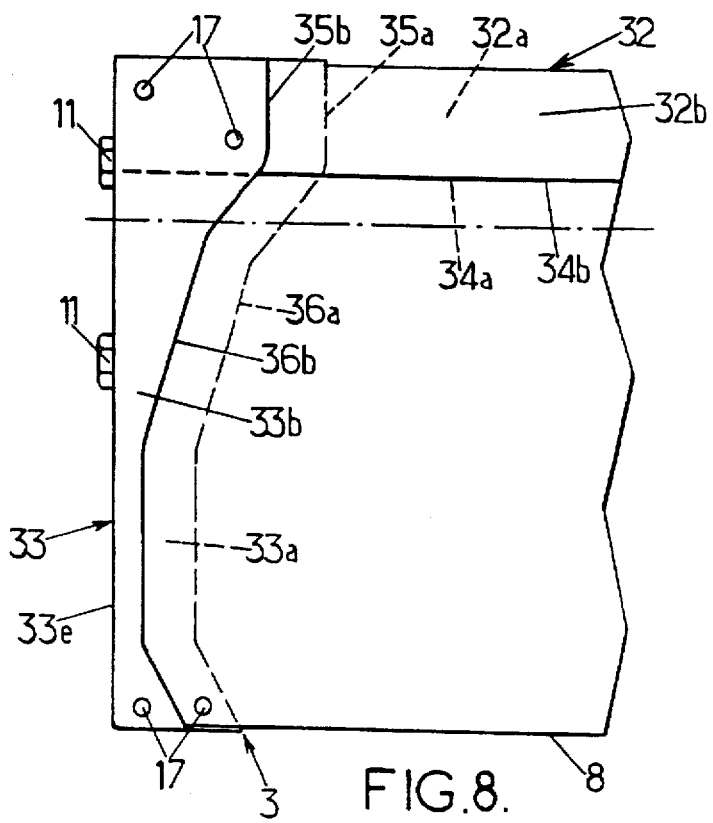
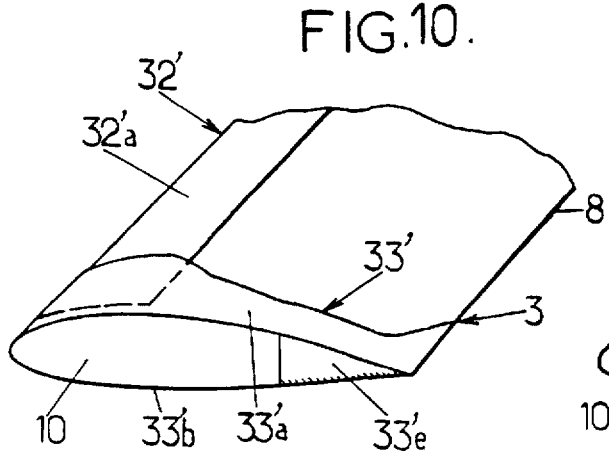
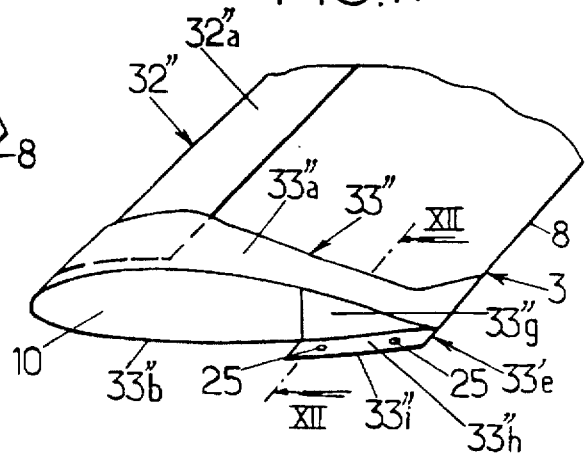
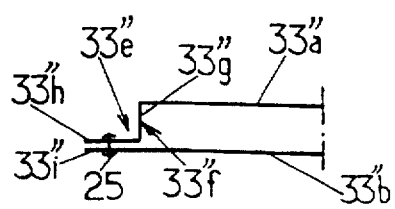

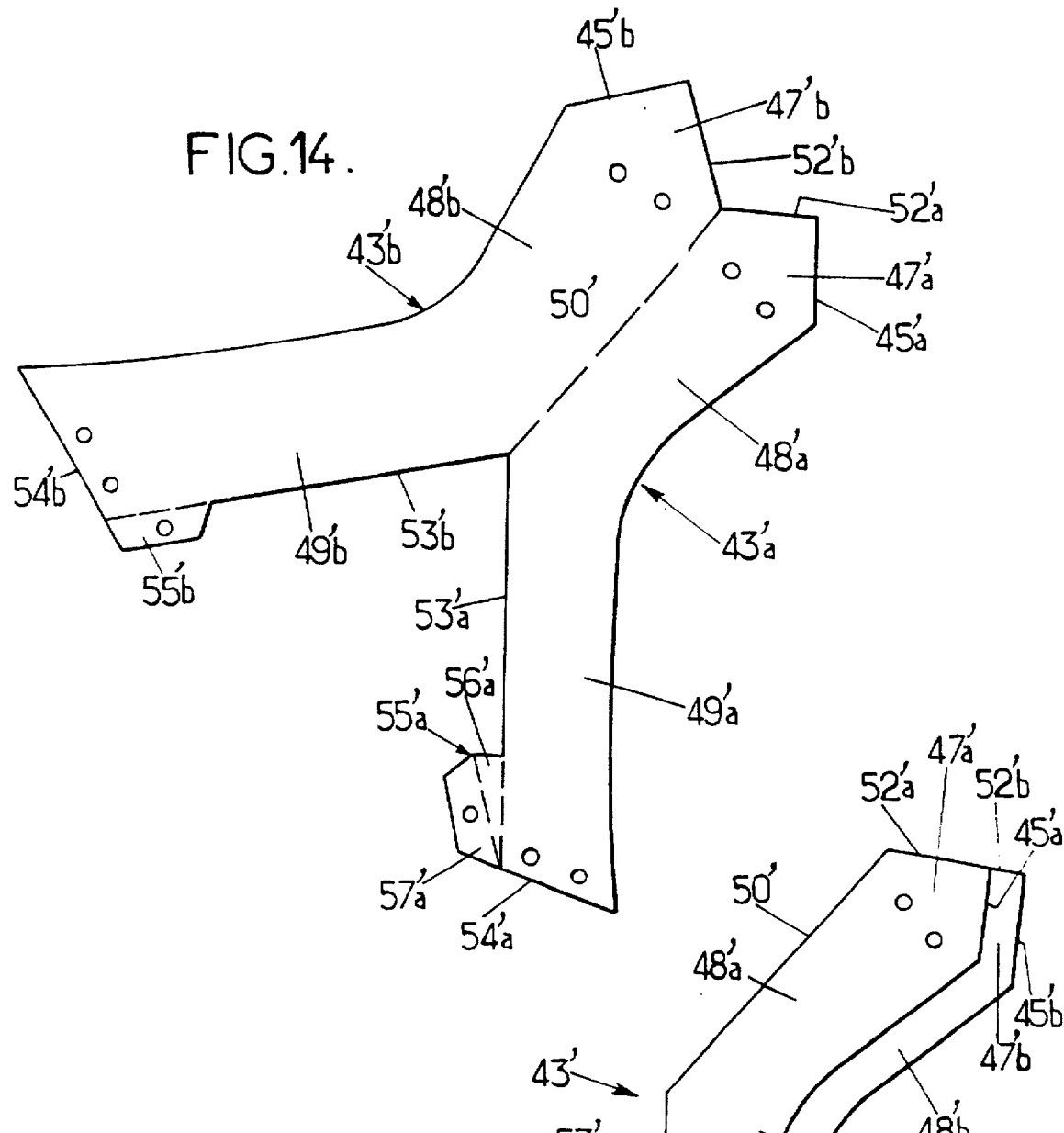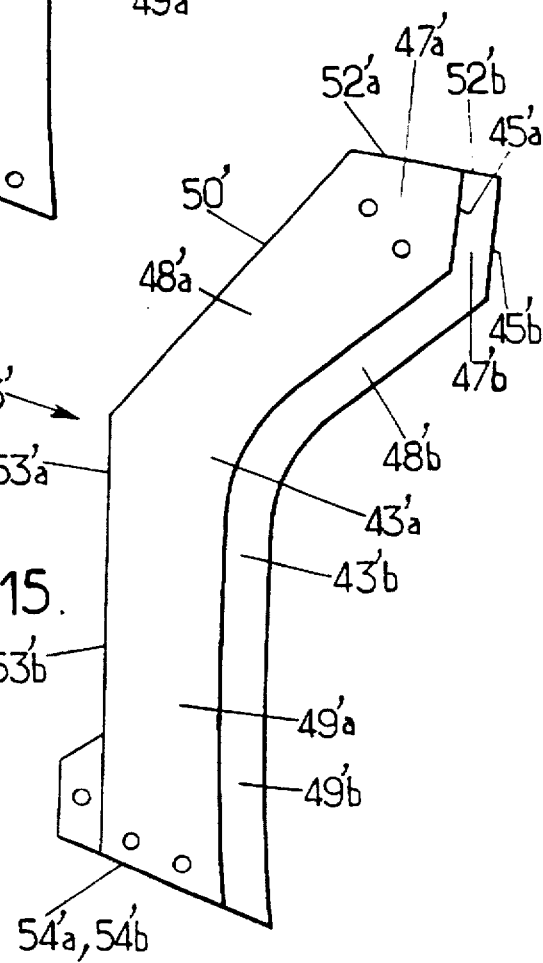

BLADE WITH SHIELDING FOR ENHANCED PROTECTION AGAINST LIGHTNING, FOR ROTORCRAFT ROTOR

The invention relates to a blade with shielding for enhanced protection against lightning for a rotorcraft rotor, and particularly for a helicopter, especially tail, rotor.

The invention relates to a blade of known type, comprising a composite structure, essentially in composite material with a synthetic matrix and inorganic and/or organic reinforcing fibres, producing a profiled main blade section delimited between a suction face surface and a pressure face surface which extend, chordwise (in the direction of the chord of the blade), between a leading edge and a trailing edge and, spanwise (in the direction of the span of the blade), between one end of said main blade section, commonly known as the tip, and a blade root which extends the opposite end of said main blade section and which includes means for attaching the blade, for linking it to a rotor hub. The end tip may, on the one hand, have a shape in plan which is in continuity with respect to the main blade section or may evolve and, on the other hand, constitute a structural element which is either incorporated into the continuity of the structure of the main blade section or is attached and distinct from the structure of the main blade section, assembly then being provided by mechanical means or by gluing around appropriately sized reinforcing members.

The blade attachment means may connect this blade directly to the rotor hub or indirectly to this hub via a linking member, commonly known as a cuff, itself connected to the hub by means of retention and articulation thereon.

U.S. Pat. No. 4,944,655 describes a propeller blade in fibre-reinforced plastic comprising a profiled main blade section intended to be attached by a blade root to a propeller hub including metallic parts, the blade also comprising a system for combined protection against erosion, icing, and lightning.

This system for combined protection includes shielding for protection against lightning, which comprises a protective metal glove made of a material which is especially electrically conducting, for example of titanium or titanium alloy and which is fixed to the leading edge and to the parts adjacent thereto of the suction face and pressure face surfaces of the main blade section, in order to provide protection of the leading edge, and a cap for protecting the blade tip, at the opposite end of the main blade section to the one which is extended by the blade root, this cap also being metallic and electrically conducting, and extending over the entire chord of the end of the blade tip which it covers, being fixed in such a way as to be in electrical continuity with the glove for protecting the leading edge. Finally, on the blade root or near the latter, the shielding for protecting the propeller blade against lightning comprises electrically conducting means, such as cables and/or tapes of metal to provide electrical continuity between the glove for protecting the leading edge and the metallic and electrically conducting parts of the hub, in order to earth the shielding for protection against lightning.

The problem underlying the invention is of enhancing the lightning resistance of the rotor blades of rotorcraft, such as helicopters, and in particular of blades of composite structure of the type defined hereinabove, especially tail rotor blades, so as to meet the stricter requirements of new standards now in force which cannot be met via the conventional means used in the blades of such rotors for allowing lightning current to pass, namely electrically conducting foils or thin metal tapes, for example of copper, incorporated into the composite structure of the blades and extending from the tip to the root of the blades.

The object of the invention is to achieve the desired improvement in the behaviour of helicopter rotor blades in lightning by applying the teachings of U.S. Pat. No. 4,944,655 and by improving the shielding means proposed in this patent on helicopter rotor blades in such a way as to make these blades more tolerant to high strength lightning currents (approximately 3 times the strength of the lightning current taken into account in the standards previously adopted in producing such blades). According to the observations in use, these currents, statistically speaking, usually strike the blades and more particularly the tips at the ends of the blades on account of their shape which naturally protrudes beyond the aircraft as a whole.

In particular, the object of the invention is to improve the shielding known from U.S. Pat. No. 4,944,655 in such a way as to improve the residual strength after a lightning strike, to allow normal flight to be continued, and the quality of the protection provided by the blade tip cap and preferably also by the leading edge glove with respect to the phenomena of detachment which may arise between, on the one hand, the cap and possibly the glove and, on the other hand, the composite structure of the blade owing especially to phenomena of repulsion developing between these elements when such a blade is struck by lightning.

Another object of the invention is to ensure the residual strength after lightning strikes, to allow normal flights to be continued, and the quality of protection, as mentioned hereinabove, using a cap attached to the blade and compatible, as a retro-fit, with blades already equipped with an electrically conducting leading edge glove, without removing this glove, as well as with new-generation blades which have a leading edge protected by a glove optimized for the passage of lightning current. In addition, the addition of such a cap tends to avoid or minimize damage which may be suffered by the composite structure of the blade in the event of it being struck by lightning.

To this end, the blade with shielding for enhanced protection against lightning according to the invention, having a composite structure and being of the type mentioned hereinabove, is equipped with shielding for protection against lightning which comprises:

- a glove for protecting the leading edge, said glove being metallic, electrically conducting, and comprising a suction face arm and a pressure face arm which are adjacent along the leading edge and fixed to underlying parts of the suction face and pressure face surfaces,
- a cap for protecting said blade tip, said cap being distinct from the glove and attached to the blade in such a way as to cover at least the end of said blade tip and being metallic, electrically conducting, and comprising a suction face arm and a pressure face arm which extend over the entire end chord of said blade tip and which are applied to underlying parts of said suction face and pressure face surfaces respectively, in the region of the tip, the cap being connected with electrical continuity to said glove either directly or by means of an intermediate linking piece, itself conducting, and fixed with electrical continuity to the glove and the cap, and
- electrically conducting means on said blade root intended to provide electrical continuity between said glove and electrically conducting means of said hub, for earthing said shielding, and is characterized in that at least said cap has a suction face arm of which the dimensions, at least spanwise, are different from the dimensions of its pressure face arm.

Thus the strength of protection provided by the cap against phenomena of detachment developing between the cap and the composite structure of the blade tip under the effect of the repulsion forces which may act upon the suction face and pressure face arms of the cap is improved, at the same time avoiding or minimising damage to the composite structure when the blade is struck by lightning.

To make it easier to produce the glove as well as to improve the strength and quality against erosion and lightning, and as already practised on some blades which have a leading edge protected by an electrically conducting glove and the protection against lightning of which needs to be improved, the glove may have suction face and pressure face arms having substantially the same dimensions, at least in the direction of the chord of the blade, and possibly also in the direction of the span. The suction face and pressure face arms of the glove are then substantially symmetric with one another with respect to the chord plane of the blade.

However, the glove advantageously has a suction face arm of which the dimensions, at least chordwise, are different from those of its pressure face arm.

This is because it is known that the passage of an electrical current from the end of one arm of a conducting body which is bent into a U as far as the end of the other arm is accompanied by the appearance on the arms of repulsive forces of magnetic origin, resulting from the mutually-opposing components of the current vector and which are stronger, the higher the strength of the current and the smaller the radius of curvature of the body. The production of suction face and pressure face arms which are asymmetric with respect to the chord plane of the blade especially on the cap and preferably also on the glove makes it possible to avoid local detachments from the composite structure of the arms of the cap and of the glove in their regions near the leading edge and near the trailing edge.

Furthermore, if the pressure face arm of the glove is given a width in the direction of the chord which is greater than that of its suction face arm, then at the same time better resistance to erosion from rain and from sand is obtained, whereas a width, in the direction of the chord, of the suction face arm greater than the width of the pressure face arm of the glove gives better aerodynamic flow over the suction face.

To improve the passage of the lightning current through the cap, towards the glove and through the latter, it is furthermore advantageous for at least one, but preferably each of the suction face and pressure face arms of the cap to have one or more of the following geometric features:

this arm has a dimension and/or material section in the direction of the span which is larger in the region near the leading edge than in the region near the trailing edge and/or which is not substantially smaller, in its region near the leading edge, than the dimension and/or material section, in the direction of the chord, of the adjacent region of the corresponding suction face or pressure face arm of the glove, this arm has a dimension and/or material section, in the direction of the span, which reduces substantially progressively from a region near the leading edge to a region near the trailing edge, then which increases in a region directly adjacent to the trailing edge and as far as the latter, so as to be fixed by at least one rivet in this region near the trailing edge, this arm has, in its region near the leading edge, an edge extending over the corresponding suction face or pressure face surface and which has a concave part, with a blend radius, substantially extended by the corresponding edge of the corresponding suction face or pressure face arm of the glove, this arm has, at least in its region near the leading edge, a developed transverse section which is at least equal to or greater than that of the corresponding suction face or pressure face arm of the glove in its region adjacent to the cap, and this additionally improves the resistance to erosion of the cap which, in rotation, is exposed to a relative velocity which is higher than the rest of the blade, the increased mass of the cap in this possibly thickened region also allowing the blade to be recentred with respect to its longitudinal pitch-change axis.

Advantageously, the edges of the suction face and pressure face arms of the cap which extend over the suction face and pressure face surfaces evolve parallel to one another but are offset one with respect to the other in the direction of the span of the blade, following, for example, a line which is polygonal or has a continuous curvature.

The resistance of the cap to tearing out under the effect of the centrifugal forces and of the aforementioned repulsive forces is provided by fixing means which are electrically conducting at least in part, fixing this cap against at least the end face of the composite structure in the region of the blade tip.

To ensure good cohesion of the cap with the composite structure of the blade at the same time as good protection of this composite structure at the end face of the tip, the fixing means comprise at least one adhesive which may be an electrically conducting adhesive, such as a polymerisable glue or adhesive of the resin on film, supported or otherwise type, which glues the cap against at least part of the end face of the blade tip and/or part of at least one of said suction face and pressure face surfaces of the composite structure, and/or part of the glove and/or of the intermediate linking piece itself glued against at least part of the glove. It should be noted that the conducting nature of the glue is not indispensable but is advantageous in the cap/glove or cap/linking piece and glove/linking piece overlap regions. If the electrical continuity between the cap and the glove is provided by means of a conducting linking piece, such as a piece of foil or metal tape visible on the composite structure of the blade and partially covered, on the one hand, by the cap and, on the other hand, by the glove, and if this foil or tape is glued using a dielectric glue, then this glue prevents the lightning current from passing along the span; repulsion is developed. In such a case, it is necessary for the glue to be conducting, and the quality of the bond provided by the corresponding gluing may be improved, including as regards the flow of lightning current, by supplementing the gluing by riveting or screwing.

For this reason, the fixing means advantageously additionally comprise mechanical means preferably having protruding shapes, such as screws and rivets.

Thus, these mechanical fixing means provide or improve the strength and the quality of protection in the event of detachment at the end of a blade, which gives the gluing provided between the composite structure of the blade and the cap a fail-safe nature. Riveting, carried out immediately after the gluing operation (before the adhesive is polymerized) may give better conditions of cohesion of the cap and the glove, and possibly the intermediate linking piece, on the composite suction face or pressure face substrate (better contact pressure applied to the assembly). Furthermore, the use of mechanical fixing means which have protruding shapes allows these means to constitute, on account of their shape, predetermined points for the lightning to strike or to exit, so that these means protect the surrounding composite structure of the blade, this being as all the more the case as these mechanical fixing means are earthed by means of the cap and the glove. For this purpose, the end of the glove towards the blade tip is advantageously at least partially straddled either directly by the cap which is fixed on the glove in electrical continuity therewith, or by means of at least one conducting linking piece of the same type, external or internal, fixed by gluing, preferably conducting gluing, and/or by riveting or screwing between the cap and the glove. This results in excellent protection against damage which may be suffered by the composite structure surrounding the mechanical fixing means in the event of it being struck by lightning.

Furthermore, it is known that helicopter rotor blades are often equipped, at the blade tip, with screws fixed into the end face of the blade tip, close to the leading edge, and which in themselves constitute balancing weights and/or are used to close casings, housings or cavities formed in the blade tip and intended to contain balancing and/or dynamic adjustment weights.

Advantageously, in a blade according to the invention, advantage is taken of the presence of such screws, and the mechanical means for fixing the cap against at least the end face of the blade tip comprise at least one such balancing screw and/or screw for closing the housing of at least one balancing and/or dynamic adjustment weight, this screw being screwed into a region of said end face of the blade tip which is closer to the leading edge than to the trailing edge. The cap may comprise not only suction face and pressure face arms, but also an electrically conducting end flange connecting the suction face and pressure face arms, and which extends across the entire section of the end face of the blade tip and is fixed against this face using the balancing screw or screws. However, this embodiment requires the dimensions of the blade and of the cap to be very accurate to ensure correct mating and bonding together of the components. In a simplified embodiment of the blade according to the invention, the screw or each screw, which may or may not be a balancing screw, may fix against the end face of the blade tip at least one cap flap which extends at least one of the suction face and pressure face arms of said cap and is bent with respect to said suction face and pressure face arms of the cap.

In an intermediate alternative form, the cap comprises, for connecting its suction face and pressure face arms, an electrically conducting partial end flange, in electrical continuity with the suction face and pressure face arms of the cap and extending over part, which is adjacent to the trailing edge, of the section of the end face of the tip.

Such a partial flange, which is metallic and strong, may be produced simply in various ways: using at least one flap extending one of the suction face and pressure face arms of the cap and bent against the end face of the tip, in its part adjacent to the trailing edge, the flap also being fixed to the other of the suction face and pressure face arms of the tip by an electrically conducting connection, for example one achieved by welding. The partial end flange may also comprise a double flap extending one of the suction face and pressure face arms of the cap, and of which part is bent against the end face of the tip, in its part adjacent to the trailing edge, while the other part of the flap is cranked and fixed in an electrically conducting way, for example using rivets, against another flap which extends the other of the suction face and pressure face arms of the cap and which projects, in the direction of the span, beyond the end face of the blade tip.

Whether the end flange is complete or partial, it makes it possible to improve the lightning protection while substantially respecting the spanwise integrity of the composite structure of the blade, and that of the two suction face and pressure face arms of the cap itself.

The cap may be rendered integral with the composite structure of the blade with the aid of a mechanical anchoring which can be added to or substituted for fixing using at least one balancing screw and which comprises at least one thin component in the form of a fin, which is electrically conducting, integral with the composite structure which it extends as a projection, in the direction of the span, towards the outside of the blade tip.

If the cap includes an electrically conducting at least partial end flange in electrical continuity with the cap suction face and pressure face arms, then it is advantageous for this flange to be pierced with at least one slot through which there passes at least one conducting fin, of which the portion which projects outside the flange is bent at least in part against the flange, preferably half of this portion being bent towards the suction face arm and the other half towards the pressure face arm of the cap, so as to keep the flange applied against the end face of the blade.

If the cap has no flange, but if its suction face and pressure face arms are each extended by one respectively of at least two opposed lugs, then these lugs can be bent against the end face of the blade tip and their free end parts cranked and fixed, by gluing, preferably conductive gluing and/or riveting or screwing, against two opposed faces of at least one conducting fin.

One advantage of this bonding, preferably glued and riveted, incorporating at least one non-bent conducting fin which remains protruding with respect to the end of the blade is that the metal protrusion thus achieved with the parts of lugs fixed to the fin constitutes a point at which the lightning is encouraged to enter or to exit, and which thus protects the adjacent composite coatings from a direct lightning strike without in any way disturbing the aerodynamic flow because this protrusion is placed towards the trailing edge rather than towards the leading edge of the blade. This protrusion may, in addition, serve as a reference marking point for setting the "track" or dynamic setting of the rotor.

In addition, the two previous alternative forms are advantageously compatible with the cap being mounted on the composite blade by translation in the longitudinal direction (in the direction of the span) of the cap shifted towards the blade root. These alternative forms also make it possible to have mechanical anchoring of the cap on the blade in the case of a thin face, with a short chord, in which a screw at the end cannot be fitted, so that the hatch for access to the balancing weights is arranged, for example, on the suction face.

For the strength and quality of protection afforded by the cap to be ensured, in the event of detachment from the blade tip over the entire chord thereof, the mechanical fixing means advantageously also comprise at least one rivet fixing at least one of the suction face and pressure face arms of the cap against at least one of said suction face and pressure face arms of said glove or of the intermediate linking piece and/or against at least one of said suction face and pressure face surfaces in the region of the blade tip, in a region near the trailing edge and/or in a region near the leading edge (between the glove and the cap and/or the linking piece) and/or of the conducting fin.

The blade may have a straight tip, that is to say one whose end face extends, from the leading edge to the trailing edge or as far as close thereto, in a plane substantially perpendicular to the longitudinal axis of the blade, generally situated in the front quarter of the chord starting from the leading edge. However, the blade may just as easily be equipped with a tip which is truncated over at least part of the chord, and has a leading edge which is inclined towards the trailing edge and towards the end of the tip, as well as a straight end face, it being possible for the leading edge of the tip to be straight and to be swept back with respect to the leading edge of the main blade section, or alternatively to have, in plan, a curved, for example parabolic, shape. In this case, the cap has an inclined leading edge of the same shape as that of the tip, and along which its suction face and pressure face arms are adjacent, and preferably secured together. A cap with a straight leading edge swept back at an angle has the advantage that its suction face and pressure face arms and, as the case may be, its flap(s) and/or lug(s) which can be bent with respect to the suction face and pressure face arms for fixing to the end face of the tip give(s) the cap a form which can be developed, it being possible for the cap to be fixed to the end of the glove which may itself, in the known way, have a shape that can be developed, this making it possible to produce the metal shielding in two distinct pieces of sheet cut beforehand to the required dimensions and essentially merely needing to be bent into shape by a stretching operation for each piece, on the one hand so as to form the suction face and pressure face arms of the glove and, on the other hand, so as to form the corresponding arms of the cap. The cap may be fixed to the tip and to the glove by mechanical means as mentioned hereinabove by one or two screws which do not necessarily have to have a function of balancing or of closing balancing casings, and which fix at least one lug of the cap against the end face of the tip, as well as by one or more rivets fixing the suction face and pressure face arms of the cap on the suction face and pressure face arms of the glove and/or the underlying composite structure of the blade in regions near the leading and trailing edges.

The electrically conducting means of the blade root which provide electrical continuity between the glove and the hub may comprise, by analogy with the aforementioned conventional embodiments for protecting blades against lightning, at least one braid and/or foil or metal tape which is electrically conducting extending from the end of the glove closest to the blade root as far as a fixed point of the blade root and fixed to thereto by gluing and/or riveting or screwing. However, in a blade according to the invention, it is advantageous for the electrically conducting means of the blade root to comprise a continuous extension of said glove which protects part of said blade root which comes into alignment with the leading edge as far as close to said blade attachment means, said extension of the glove being fixed at least at one point against said blade root by mechanical fixing means of the screw or rivet type and/or by an adhesive which may be conducting. These mechanical means of fixing the extension of the glove against the blade root thus ensure the strength and quality of the protection in the event of the shielding becoming detached in the blade rooting area.

When the means of attaching the blade to the hub or to a member for linking to the hub comprise, on the blade root, at least one metallic and electrically conducting attachment bushing, and more commonly two parallel bushings, then according to an alternative form, said continuous extension of the glove may advantageously extend as far as being in direct connection with the attachment bushing or bushings. This makes the presence of metallization pads and/or braids which are used in the conventional shielding of blades against lightning unnecessary.

For other types of blade attachment, such as fork, torsion strip, torsion blade, mono-winding, not specifically described because they are well known, a similar continuous extension is advantageously produced. This conducting extension may be associated with or replaced by metallizing foil or braid, good electrical continuity between the foil or the braid and the glove being provided by conducting gluing associated with riveting or screwing or some other mechanical means of fixing so as to avoid any repulsion phenomenon. Likewise, the material sections of the various conducting components are dimensioned so as to keep optimum flow of electrical charges with the minimum of Joule-effect losses which would cause heating and local detachments.

Advantageously also, for the lightning to enter or to exit in such a way as to protect the composite structure in the region of the blade tip it is advantageous for the cap in the same way as for the flap to have a trailing end which protrudes projecting beyond the trailing edge of the blade, so as to produce a point encouraging the lightning to enter or to exit thereby.

When the reinforcing fibres of the composite structure of the blade comprise carbon fibres, it is furthermore made advantageous for the blade to comprise, at least between its main blade section and the leading edge glove, an underlying glove, preferably a dielectric one, such as a composite with synthetic matrix and glass reinforcing fibres which advantageously insulates the leading edge glove from the carbon-fibre composite material so as to take account of the electrically conducting nature of these fibres which makes any composite containing them particularly sensitive to damage by lightning.

Figure 6:
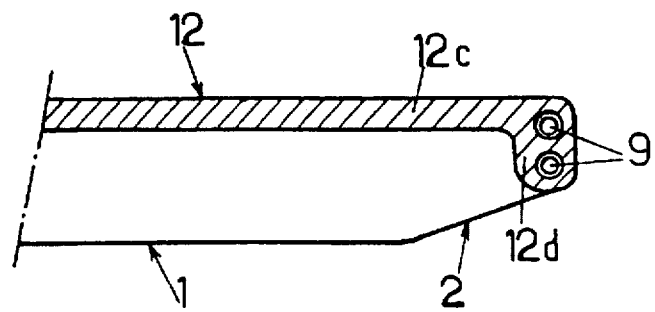
Figure 7:
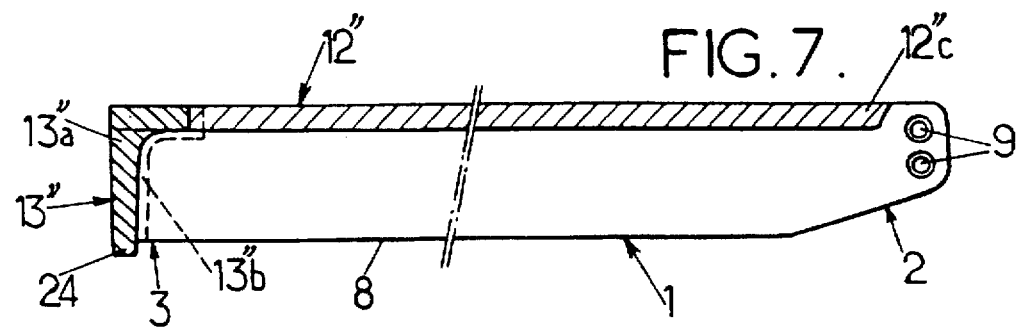
Figure 13:
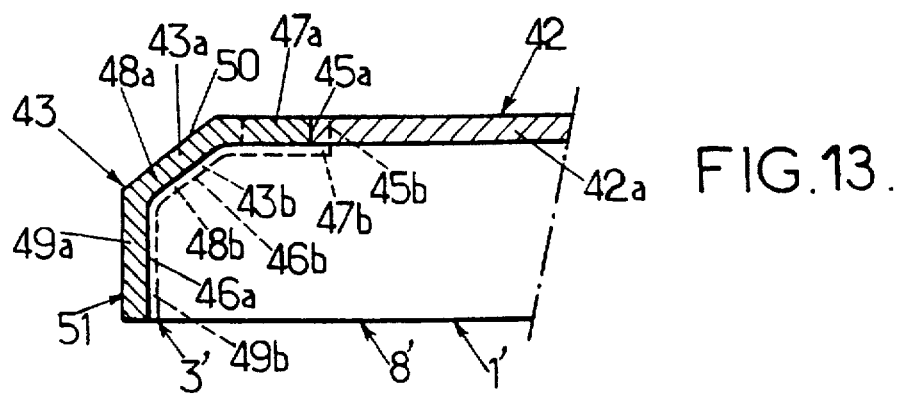
Figure 10A:
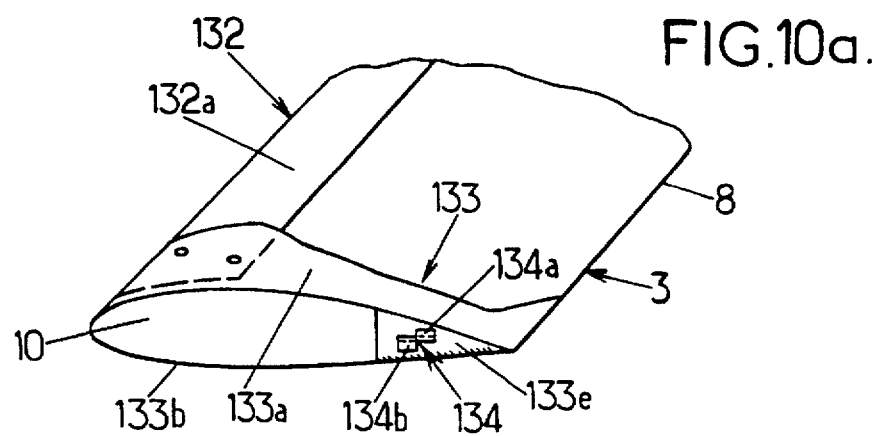
Figure 11A:
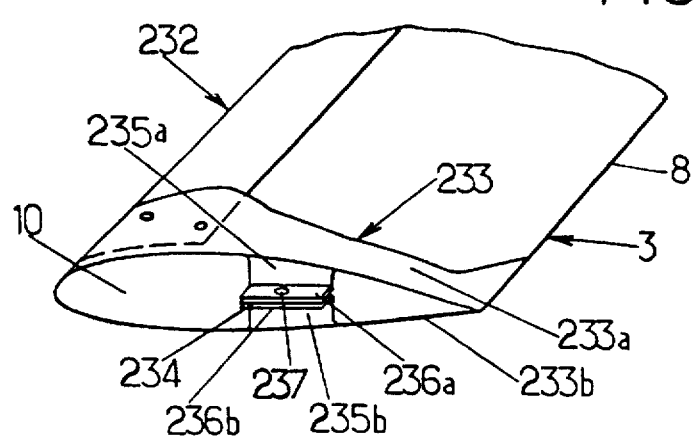
Figure 11B:
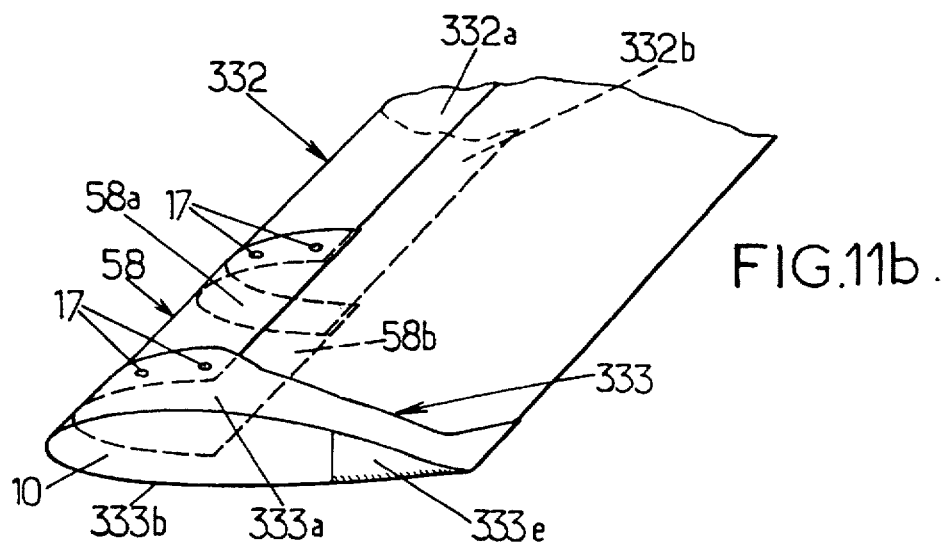

Further advantages and features of the invention will emerge from the description given hereinbelow without implied limitation, of embodiments described with reference to the attached drawings in which:

FIG. 1 is a diagrammatic plan view of a tail rotor blade with shielding for protection against lightning, FIG. 2 represents in side elevation the end of the tip of the blade of FIG. 1, on a larger scale, FIG. 3 is a partial view similar to FIG. 1 for a first alternative embodiment, in the blade root attachment region, FIG. 4 represents partially, in plan and on a larger scale, just the tip of a second alternative form of blade, with a straight end, FIG. 5 is an exploded diagrammatic section through the glove on V—V of FIG. 4, FIG. 6 represents diagrammatically and partially in plan just that part of a third alternative form of blade which corresponds to the blade root and to an adjacent face of the main blade section, FIG. 7 represents diagrammatically in plan, a fourth alternative embodiment, FIGS. 8 and 9 are views similar respectively to FIGS. 4 and 2 for a fifth alternative form of blade, FIGS. 10, 10a, 11, 11a and 11b are partial views in perspective of five alternative forms of the blade of FIGS. 8 and 9, the alternative form of FIG. 11b including an electrically conductive intermediate linking piece providing electrical continuity between the cap and the glove, FIG. 12 is a diagrammatic view in part section on XII—XII of FIG. 11, FIG. 13 is a partial and diagrammatic plan view of another alternative form of blade with truncated tip, FIG. 14 is a digrammatic plan view of a piece of sheet precut to the dimensions of a cap which can be developed for a blade with swept-back tip, and FIG. 15 is a view similar to FIG. 14 of the shielding sheet bent to form the protective cap.

The blade of FIGS. 1 and 2 is a helicopter tail rotor blade essentially consisting of a structure of composite material with a synthetic matrix (for example a thermosetting resin) reinforced with inorganic and/or organic (for example glass, carbon or aramid) fibres, forming a main blade section 1 which is profiled to the desired aerodynamic profile, extended, at one end intended to be fixed to a rotor hub, by a blade root 2 which, in this example, has a trapezoidal form in plan, while the opposite end of the main blade section 1 constitutes a blade tip 3.

The composite structure of the blade, which forms its main blade section 1, and which can be extended more or less fully into the blade root 2, may be any known structure, for example a mono- or multi-spar structure with rovings of unidirectional fibres agglomerated by an impregnation resin, and interacting with a suction face surface 5 and a pressure face surface 6 which consist of stratified coverings of layers of fibres agglomerated with resin (for example fibre fabrics or webs of fibres), so as to constitute a single-space or multi-pocket structure which may be filled, between the spar or spars and the stratified pressure face and suction face coverings, with filler bodies made in synthetic foam.

FIG. 1 shows that the main blade section 1 of the blade has a form in plan which is substantially rectangular so that the leading edge 7 and trailing edge 8, between which the suction face and pressure face surfaces 5 and 6 extend chordwise, are substantially mutually parallel.

The long base of the right-angled trapezium shape which the blade root 2 makes in plan view is adjacent to the main blade section 1 and in this region has a chord equal to the substantially constant one of the main blade section 1 except in the region of the blade tip 3 where the chord reduces slightly in value. On the same side as its short base, that is to say on the side intended to point towards the hub of the rotor, the blade root 2 has blade attachment means which consist (FIGS. 1, 3, 6 and 7) of two metallic and electrically conducting bushings 9 which are parallel and pass through the blade root 2 in its thickness at right angles to the plane of FIG. 1. These two bushings 9 make it possible, in a known manner, to attach the blade with the aid of two pins which pass through them, for example in a radially outer (with respect to the axis of rotation of the hub) end clevis of a metallic member for linking the blade to the hub, which member may, in a known manner, consist in its central part of a cuff and include a radially inner end part, also in the form of a clevis, connected to the hub by retaining and articulating means such as a laminated spherical stop according to a well-known method of mounting which need not be described or represented further.

Other known types of blade attachment (fork, torsion blade, mono-winding, etc.) are compatible with the fitting of a glove and of an end cap as described hereinbelow for protecting the blade against lightning.

In a way which is also known, the structure of the blade has, in the blade tip 3, casings or housings (like those represented at 23 in FIG. 4) for balancing and/or dynamic adjustment weights which open into the end face 10 (see FIG. 2) of the blade tip 3, for the insertion or removal of said weights, and which are closed by two screws 11, themselves constituting balancing weights which are screwed into that half of this face 10 which is near the leading edge 7. More generally speaking, these casings can be situated either towards the suction face side or towards the pressure face side of the blade and may be accessible via access hatches in the suction face or in the pressure face of the profile at the end region.

The above-described blade is protected against lightning by shielding which essentially comprises two metallic and electrically conducting components made of stainless steel or by stretching and shaping of two titanium sheets, or more generally any other metallic material which is a good conductor of electricity (electroformed nickel for example) and which is not fragile with respect to erosion by sand and by rain, which components are, on the one hand, a glove 12 for protecting the leading edge 7 of the main blade section 1 and, on the other hand, a cap 13 covering the blade tip 3 while extending over the entire chord thereof, straddling not only the tip 3 from its leading edge to its trailing edge but also the end of the glove 12 or of a profiled intermediate linking piece providing electrical continuity between the glove and the cap (the linking piece being internal or external to the glove) which extends over the tip 3. The glove 12, similar to conventional gloves for protecting the leading edge of blades against erosion and providing this erosion protection effectively, has a substantially U-shaped transverse section defined by a suction face arm 12a and a pressure face arm 12b which are adjacent to one another along the leading edge 7 covered by the glove 12 and which extend respectively over parts, adjacent to this leading edge 7, of the suction face surface 5 and pressure face surface 6 of the main blade section 1, to which surfaces the glove 12 is secured by gluing, using any appropriate adhesive, preferably an electrically conducting adhesive.

The arms 12a and 12b have substantially the same width, measured in the direction of the chord and in the direction of the span despite the asymmetry of the cap 13, as described hereinbelow, so that the arms 12a and 12b of the glove 12 are substantially symmetric to one another with respect to the chord plane of the blade.

The cap 13 which covers the blade tip 3 as far as the trailing edge 8 as well as the end of the glove 12 or of a profiled conducting linking piece fitted in between the glove and the cap, which protects the leading edge of the tip 3, comprises a suction face arm 13a which, in its region near the leading edge 7, straddles the suction face arm 12a of the glove 12 or of the intermediate linking piece and extends it in the direction of the span, and which, behind this region, extends in the direction of the chord, with a form in plan which is substantially trapezoidal, as far as the trailing edge 8. The cap 13 also comprises a pressure face arm 13b, which, in a similar way, has a front region near the leading edge 7 straddling and extending the pressure face arm 12b of the glove 12 or of the intermediate linking piece in the direction of the span, and a rear region which extends in the direction of the chord, being substantially of the same trapezoidal shape as the rear region of the suction face arm 13a. However, the front and rear regions of the pressure face arm 13b are respectively broader, in the direction of the span and starting from the end face, than the front and rear regions of the suction face arm 13a. The internal edges 15a and 15b (pointing towards the blade root 2) of the front regions of the suction face and pressure face arms 13a and 13b of the cap 13 respectively straddle the suction face and pressure face arms 12a and 12b of the glove 12 or of the intermediate linking piece, substantially at right angles to the leading edge 7 and as far as the rear edge 14a or 14b of this arm 12a or 12b and connect respectively to the internal edges 16a and 16b extending over the suction face surface 5 and pressure face surface 6 of the rear regions of the suction face and pressure face arms 13a and 13b of the cap 13 via a concave part, the concavity of which pointing towards the trailing edge 8 and rounded with a blend radius. These concave parts are connected to the edges 15a and 15b by segments superimposed with the rear edges 14a and 14b of the arms 12a and 12b of the glove which extend them towards the blade root 2. The internal edges 16a and 16b of the rear regions of the arms 13a and 13b of the cap 13 are substantially straight and mutually parallel, being offset from one another in the direction of the span of the blade owing to the fact that the pressure face arm 13b is wider, in the direction of the span, than the suction face arm 13a, at any point taken along the chord. Each of the arms 13a and 13b of the cap 13 has a width in the direction of the span which is greater than the width in the direction of the chord of the arm 12a or 12b of the glove 12 to which it is connected, in its region near the leading edge 7 in order to make it easier for the lightning current to pass in this region in the direction of the span as in the direction of the chord. Furthermore, each arm 13a and 13b has a width in the direction of the span which reduces progressively from its region near the leading edge 7 as far as the trailing edge 8. However, in their region near the trailing edge, the arms 13a and 13b keep sufficient width, in the direction of the span, for it to be possible for each of the arms 13a and 13b to be fixed to the underlying part of the composite structure of the blade by at least one, or even two rivets 17 at minimum. Likewise, in its front region, each suction face arm 13a or pressure face arm 13b of the cap 13 is fixed by two rivets 17 to the part which it covers respectively of the suction face arm 12a or pressure face arm 12b of the glove 12 or of the intermediate linking piece as well as to the underlying composite structure of the blade.

As shown in FIG. 2, the cap 13 also comprises two lugs 13c and 13d which are in alignment, in the case of the first one 13c, with the middle region, in the direction of the chord, of the suction face arm 13a of the cap 13 and, in the case of the second one 13d, with the region near the leading edge 7 of the pressure face arm 13b of the cap 13, these two lugs 13c and 13d being bent with respect to these arms 13a and 13b and applied against the end face 10 of the blade tip 3 to which each of the two lugs 13c and 13d is fixed by one of the two balancing screws 11 respectively. Thus, the lugs 13c and 13d of the cap 13 are in direct contact, and therefore in electrical continuity, with these metallic and electrically conducting screws 11, the heads of which project outside the end face 10 of the blade tip 3 and the shanks of which are engaged in the surrounding composite structure of the main section 1 of the blade.

Before the screws 11 and rivets 17 are fitted, the glove 12 and the cap 13 are glued hot, or alternatively cold, or warm, to the composite structure of the blade either at the same time as the matrix of this composite structure is being polymerized, using a co-baking operation, or after this polymerization. The cohesion between the cap 13 and the blade tip 3 is ensured using a glue, preferably an electrically conducting glue, in the region of contact with the glove 12 of the leading edge or the intermediate linking piece, gluing its arms 13a and 13b against the suction face and pressure face surfaces 5 and 6, and its lugs 13c and 13d against the end face 10 of the tip 3.

The screws 11 and rivets 17 supplement the simple glue fixing of the cap 13 on the composite structure of the blade and thus ensure the strength and quality of the metallic protection of the blade tip 3 in the event of detachment, in this region, between the cap 13 and the composite structure of the blade, whether this detachment be the result of centrifugal and/or aerodynamic forces during rotation of the rotor or of the blade being struck by lightning, developing repulsive forces on the arms 13a and 13b of the cap 13. As the arms 13a and 13b are asymmetric owing to their different widths, in the direction of the span, the widest pressure face arm 13b is less affected by these repulsive forces, and the cap 13 is relatively well protected against detachment of its arms 13a and 13b. Thanks to the lugs 13c and 13d as well as to the suction face and pressure face arms 13a and 13b of the cap 13, the metallic and electrically conducting screws 11 and rivets 17 are earthed, in order to avoid the damage that may be suffered by the surrounding composite structure surrounding these screws 11 and rivets 17 in the event of a lightning strike, the lightning current being led away by the cap 13 and the glove 12, in electrical continuity with the cap 13 via the front part thereof which straddles the glove 12 and is fixed in contact with the glove 12 by the rivets 17 then towards the hub by the means described hereinbelow. It should be noted that owing to their protruding shapes, the screws 11 and rivets 17 constitute predetermined points for the lightning to strike or to exit, and thus protect the surrounding composite structure of the blade.

The shielding consisting of the glove 12 and of the cap 13, as well as the screws 11 and rivets 17, which are all electrically conducting elements, are earthed by an electrically conducting metallic tape 18 which extends over the suction face surface of the blade root 2 being secured, by one end 18a, to the end of the glove 12 on the blade root 2 side and fixed, by its other end 18b, and with the aid of a screw or a rivet 19, to the blade root 2 right by the attachment bushings 9 so that after the blade has been mounted in the clevis which takes the cuff for linking with the hub, the conducting tape 18 is in electrical continuity via its end 18b with the metallic and electrically conducting components of the cuff for linking to the hub and of the hub. A conducting tape such as 18 can be mounted in a similar way on the suction face surface or on the pressure face surface of the blade root 2.

The alternative form of FIG. 3 can be distinguished from the example described hereinabove with reference to FIGS. 1 and 2 only by the means providing the earthing of the shielding in the region of the blade root 2. For this purpose, the conducting tape 18 of FIG. 1 is omitted and advantageously replaced by a continuous extension 12c of the leading edge glove 12 which extends in the direction of the leading edge of the blade root 2 in alignment with the leading edge of the main blade section 1 and in such a way that the end of the glove 12 on the opposite side to the cap 13 is fixed right by the two attachment bushings 9 by a screw or a rivet 19 into each of the suction face and pressure face arms of the extended glove 12. These screws or rivets ensure the strength and quality of the metallic protection in the region of the blade root 2 in the event of detachment in this region between the extension 12c of the glove 12 and the underlying structure, at least partially composite, of the blade root 2.

According to the other alternative form of FIG. 6, the extension 12c of the glove 12, which covers the entire leading edge of the blade root 2 is extended itself, on the suction face side, by an end plate 12d and, preferably also on the pressure face side, by a similar end plate (not represented), and the two plates such as 12d are in direct contact with the attachment bushings 9. These bushings 9 thus play a part in earthing the shielding for lightning protection. The passage of lightning current from the cap 13 is thus ensured by the glove 12 and its extension 12c of the blade root 2, then by the plates such as 12d, the attachment bushings 9, the pins fixing these bushings into the radially outer clevis of the cuff for linking to the hub, and then by this cuff as far as the metallic parts of the hub.

The alternative form of FIGS. 4 and 5 can be distinguished from the examples described earlier by several differences of unequal importance. The most important is that the glove 12' has a pressure face arm 12'b which is wider, in the direction of the chord, than its suction face arm 12'a. The rear edge 14'b of the arm 12'b is therefore offset towards the trailing edge 8 with respect to the rear edge 14'a of the suction face arm 12'a. The internal edges 15'a and 16'a of the front and rear regions of the suction face arm 13'a of the cap 13' are parallel respectively with the internal edges 15'b and 16'b of the front and rear regions of the pressure face arm 13'b of the cap 13' but offset in the direction of the span, and the concave part connecting the internal edge 16'a to the internal edge 15'a, which straddles the suction face arm 12'a of the glove 12' or of a profiled conducting linking piece which is intermediate between the glove 12' and cap 13', is extended by the rear edge 14'a of this suction face arm 12'a, while the concave part connecting the internal edge 16'b to the internal edge 15'b, which straddles the pressure face arm 12'b of the glove 12' or of the intermediate linking piece is extended by the rear edge 14'b of the pressure face arm 12'b.

In this alternative form the asymmetry with respect to the chord plane of the blade between the suction face arms 12'a and 13'a and pressure face arms 12'b and 13'b of the glove 12' and of the cap 13', resulting from their different dimensions in the direction of the chord and/or in the direction of the span of the blade, is a particularly favourable feature, the consequences of which are described hereinbelow with reference to FIG. 5 for the glove 12'.

In the event of the blade being struck by lightning, if the lightning current travels from one of its rear edges 14'a and 14'b towards the other, passing through the leading edge of the glove 12', then repulsive forces of magnetic origin resulting from the mutually opposing components of the current vector, and which are stronger, the higher the strength of the current and the smaller the radius of curvature of the glove 12' appear on the arms 12'a and 12'b. These repulsive forces tend to move the arms 12'a and 12'b apart, and therefore to tear them off the composite structure denoted overall as 20 in FIG. 5, and to which these arms 12'a and 12'b are glued, as mentioned hereinabove. By contrast, when the lightning current travels from the leading edge of the glove 12 along each arm 12'a and 12'b towards the rear edge 14'a or 14'b of this arm, then the forces which are developed on the arms 12'a and 12'b tend to pull them closer together, which produces an effect favourable to the cohesion of the glove 12' on the composite structure 20.

When the two arms of the glove have the same width, in the direction of the chord, the repulsive forces developed in the aforementioned case produce an effect which is unfavourable to the cohesion of the glove on the composite structure, because they tend in preference to detach the pressure face and suction face arms of this glove.

By contrast, in FIG. 5, since one, 12'b, of the arms of the glove 12' has the width (in the direction of the chord) which is greater than that of the other, 12'a, this gives a favourable region on the wider arm 12'b, this region being delimited between its rear edge 14'b and the projection on the arm 12'b of the rear edge 14'a of the other arm 12'a, thanks to which region the repulsive forces acting upon the unfavourable region delimited between the leading edge of the glove 12' and the rear edge 14'a or its projection onto the arm 12'b are not high enough to cause local detachment of the arms 12'a and 12'b, particularly of the wider arm 12'b.

In this embodiment, in which the pressure face arm 12'b is the wider one, the suction face arm 12'a is acted upon more than the pressure face arm 12'b, which simultaneously provides better resistance to erosion from rain and from sand.

As an alternative, it is of course possible to give the suction face arm 12'a a width greater than that of the pressure face arm 12'b. In this case, excellent adherence is obtained at the rear edge 14'a, which is furthest back towards the trailing edge, of the suction face arm 12'a, which is acted upon less than the pressure face arm 12'b, the great width of the suction face arm 12'a at the same time having the effect of providing better aerodynamic flow over the suction face of the blade if the cap 13' is attached to the original aerodynamic profile, but it may also constitute better protection against impact due to lightning coming from the outside upstream end of the aircraft.

The same phenomena arise on the cap 13', as in any case they do on the cap 13 of the alternative forms described hereinabove, on account of the asymmetry of the suction face and pressure face arms which are due to their difference in width in the direction of the span of the blade.

Another difference, also described with reference to FIG. 5, is that when the composite structure 20 of the blade comprises carbon reinforcing fibres which are electrically conducting while the synthetic matrix of the composite material is insulating, then a dielectric underlying glove 21 is placed under the leading edge glove 12' in order to insulate the composite structure 20 of the blade from its conducting leading edge glove 12'. In this case, the underlying dielectric glove or underglove 21 may advantageously be made in composite material with the same synthetic matrix as the rest of the composite structure 20 of the blade and glass reinforcing fibres and have a suction face arm 21a and a pressure face arm 21b which are at least as wide, in the direction of the chord, as the suction face arm 12'a and pressure face arm 12'b respectively of the glove 12', the cohesion of the under-glove 21 with the composite structure 20 being ensured by polymerizing this structure 20.

When the composite structure of the blade has only glass or aramid reinforcing fibres which are not electrically conducting, then it is preferable to have such an under-glove of dielectric material, in order to insulate the working covering of the blade from other necessary features or other equipment installed, such as blade de-icing equipment.

Another difference is that the pressure face arm 13'b of the cap 13' is, in its region near the trailing edge 8, wide enough (in the direction of the span) to be fixed to the underlying composite structure of the blade by three rivets 17, whereas the region of the suction face arm 13'a near the trailing edge 8 is fixed by two rivets 17, like in the previous examples. In addition, each of the suction face arm 13'a and pressure face arm 13'b is also fixed, in its front region, near the leading edge, to the part which it straddles of the suction face arm 12'a or pressure face arm 12'b of the glove 12' and to the underlying composite structure by another two rivets 17.

The internal edge 15'a of the front part of the suction face arm 13'a of the cap 13' straddling and extending the suction face arm 12'a of the glove 12' or of the intermediate linking piece, in the direction of the span of the blade, may define a discontinuity projecting from the suction face surface of the protective shielding in the direction going from the glove 12' to the cap 13'. In the direction of the chord, this discontinuity extends over the entire width of the suction face arm 12'a of the glove 12'. The internal edge 15'b of the pressure face arm 13'b of the cap 13' in the same way forms a similar discontinuity along the pressure face arm 12'b of the glove 12'. These discontinuities correspond to an increase in thickness of the shielding in its region near the leading edge of the tip 3. The arms 13'a and 13'b of the cap 13', or just one of these, may be thickened locally in a rear part and/or in a front part, possibly on the outside, in the direction of the span, of the end of the glove 12' under the cap 13' in order to compensate, at least in part, for the thickness of the glove 12' and, as appropriate, of the intermediate linking piece in its parts covered by the cap 13'. The resulting increase in mass makes it possible to recentre the blade with respect to its longitudinal pitch-change axis X—X in the front quarter, in the direction of the chord, from the leading edge. In addition, the shielding of the tip 3 is thus more resistant to erosion, bearing in mind that it is exposed, when rotating, to a higher relative speed. This compensation may take place directly, as an alternative, by varying the positions of the weights inside the balancing casings, or indirectly by incorporating a counterweight into the front structure of the blade (shifting weight preferably from the back forwards). Either one of these devices makes it possible to get around the presence of a discontinuity which is unfavourable for aerodynamic performance. However, a compromise has to be reached regarding the dimensions and thickness of the cap 13', because in order to alter the balance of the original rotor as little as possible, or in the event of a cap 13' being lost and in order to minimize the overall weight of a blade, it is preferable for the weight of the cap 13' to be low, and therefore also for its dimensions and thickness to be small.

As far as the rest is concerned, this alternative form again comprises the two balancing screws 11 closing the housings, represented diagrammatically as 23, for balancing and/or dynamic adjustment weights simultaneously fixing lugs 13'd and 13'c of the cap 13' against the end face of the blade tip 3, as described hereinabove with reference to FIG. 2.

A blade according to the alternative form of FIGS. 4 and 5, with shielding of which the glove 12' and the cap 13' have pressure face arms 12'b and 13'b of larger dimensions than the suction face arms 12'a and 13'a is particularly suitable for a conventional helicopter tail rotor of which the direction of rotation and the position, with respect to the rigid tail fairing or tail pylon supporting the rotor, are such that the pressure face of the blades points towards the outside with respect to the pylon, also covered with an electrically conducting metallic leading edge which is earthed to allow lightning current to pass.

The alternative form of FIG. 7 can be distinguished essentially from the example of FIGS. 1 and 2 by the presence of a point via which lightning is encouraged to enter or to exit on the cap 13". In effect, the suction face arm 13"a and pressure face arm 13"b of this cap 13" are each extended and meet projecting beyond the trailing edge 8 of the blade so as to produce a trailing end 24 of the cap 13". This trailing end 24 protrudes projecting beyond the trailing edge 8 of the blade so as to constitute said point at which the lightning is encouraged to enter or to exit. The arms 13"a and 13"b of the cap 13" have different dimensions in the direction of the span, except in their rear end forming the end 24, because the latter is behind the chord of the blade tip 3. By contrast, the glove 12" has suction face and pressure face arms which have the same dimensions in the direction of the chord and of the span, and are therefore substantially symmetric with one another. Although these are not represented, this alternative form also includes screws and rivets for fixing the cap 13" on the underlying part of the composite structure of the blade and, in its front region, on the parts which it covers of the glove 12". The glove 12" extends, in the direction of the span of the blade, with a continuous extension 12"c substantially like in the example of FIG. 3, which covers the leading edge of the blade root 2 as far as right by the attachment bushings 9.

In the alternative form of FIGS. 8 and 9, the suction face arm 33a and pressure face arm 33b of the cap 33 are joined together continuously from the leading edge to the trailing edge by an end flange 33e of the cap 33 (see FIG. 9). This flange 33e is in the same electrically conducting metal as the arms 33a and 33b and it extends against the entire section of the end face of the blade tip 3, the end part of which is thus completely covered by the cap 33. The flange 33e is fixed against the end face of the tip which it covers by two screws 11 which, like in FIGS. 2 and 4, may be balancing screws and/or screws for closing the housings of balancing and/or dynamic adjustment weights (as represented as 23 in FIG. 4). Like in FIGS. 1, 3, 6 and 7, we again see that the suction face arm 32a and pressure face arm 32b of the glove 32 have the same width, in the direction of the chord, but in this alternative form, unlike in the preceding examples, the suction face arm 33a of the cap 33 is wider in the direction of the span than the pressure face arm 33b so as to favour good aerodynamic flow over the suction face of the blade tip 3. We also see that the contours of the inner edges 35a and 35b and 36a and 36b of the front and rear parts of the arms of the cap 33 are parallel and offset with respect to each other in the direction of the span of the blade and that the internal edges 35a and 35b of the front parts of the arms 33a and 33b straddle the corresponding arms 32a and 32b of the glove 32 or of an intermediate linking piece as far as their respective rear edge 34a or 34b, being straight and substantially perpendicular to the leading edge. However, in this example, the internal edges 36a and 36b of the rear parts of the arms 33a and 33b are not straight from their concave part with blend radius connecting to the corresponding internal edge 35a or 35b as far as the trailing edge. These edges 36a and 36b each consist of a succession of four substantially straight segments, the first of which, towards the rear edge 34a or 34b of the glove 32, is greatly inclined so as to correspond to a rapid reduction in the width of the corresponding arm 33a or 33b, running along the direction of the chord towards the trailing edge, and the second of which, following on from the first, is inclined less than the first one so as to correspond to a less rapid reduction in the width of the arms 33a and 33b. The third segment of the edges 36a and 36b is substantially parallel to the end flange 33e and thus delimits a portion of the arms 33a and 33b of constant width (in the direction of the span). Finally, the fourth segment in the region of the arms 33a and 33b which is directly adjacent to the trailing edge 8, is inclined in the direction which increases the width of the arms 33a and 33b as far as the trailing edge 8. This increase in width makes it possible, in those regions of the arms 33a and 33b which are near the trailing edge 8, to have enough material available for fixing these parts to the underlying composite structure of the blade using at least one rivet 17. Despite this increase in width close to the trailing edge 8, the arms 33a and 33b of the cap 33 are still wider in their front region adjacent to the leading edge than in their region adjacent to the trailing edge and, close to the leading edge, these arms 33a and 33b have a width which is greater than the width (in the direction of the chord) of the suction face arm 32a and pressure face arm 32b ' of the glove 32 respectively. Thus, in the regions near the leading edge, the arms 33a and 33b can each be fixed to that part of the arm 32a or 32b of the glove 32 or of the intermediate linking piece which it covers and to the underlying composite structure of the blade by two rivets 17 in addition to conductive gluing. The screws 11 and rivets 17 ensure good mating of the cap 33 on the blade tip 3 and on the external end of the glove 32 and/or of the intermediate linking piece, particularly on the end face of the tip 3 and on the regions near the leading edge as well as the regions of the tip 3 near the trailing edge. In addition, these screws 11 and rivets 17 like in the preceding examples, provide electrical continuity between the various corresponding parts of the cap 33, supplementing the effects of the gluing also fixing the cap 33 on the blade tip 3 and in a conducting way preferably on the external end of the glove 32 that the cap 33 straddles.

As an alternative to the example of FIGS. 8 and 9, the four segments describing the edges 36a and 36b are replaced in an equivalent way, by a curve passing substantially through the various points where the segments meet, provided that the surface of conducting material forming the cap 33 is, on average, unchanged along the chord.

In order not to have to produce the cap 33 as a single piece with very precise dimensions, necessary for good mating and good gluing of this attached component on the composite structure of the blade, fitted with its glove 32, the full flange 33e of the alternative form of FIGS. 8 and 9 may be replaced by a partial flange, possibly adjacent to the trailing edge, as in the alternative forms of FIGS. 10, 10a, 11 and 11a.

In FIG. 10, the partial end flange 33'e extends between the suction face arm 33'a and pressure face arm 33'b of the attached cap 33', being applied only against that part of the section of the end face 10 of the tip 3 which is adjacent to the trailing edge 8 of the blade. This partial flange 33'e consists of a flap which, in this example, extends that part of the suction face arm 33'a which is adjacent to the trailing edge 8, and this flap 33'e is bent with respect to this arm 33'a so as to be applied against the rear part of the end face 10 of the tip 3, the flap 33'e additionally being welded, along its opposite edge to the bent edge, to the pressure face arm 33'b so that the partial flange 33'e thus produced connects the suction face arm 33'a and pressure face arm 33'b together, being in electrical continuity therewith. As far as the rest is concerned, the arms 33'a and 33'b of the cap 33' have substantially the same shape as those of the attached cap 33 of FIG. 8, and each partially covers the corresponding suction face arm 32'a or pressure face arm of the glove 32' in the same conditions as in FIG. 8, the rivets 17 not having been represented.

In FIG. 10a, the cap 133 is similar to the cap 33' of FIG. 10 insofar as it includes a conducting partial end flange 133e, in electrical continuity with the suction face arm 133a and pressure face arm 133b of the cap 133 to which the flange 133e is secured and between which arms it extends, the cap 133 being attached to the blade tip 3 and in electrical continuity with the leading edge glove 132 like in the preceding examples. The flange 133e may be constructed, like the one 33'e of FIG. 10, by a flap secured to the suction face arm 133a and bent against that part of the end face 10 which is adjacent to the trailing edge 8, the lower edge of this flap being welded to the edge of the pressure face arm 133b. The essential difference compared with the example of FIG. 10 is that the flange 133e is pierced with a slot which, when the cap 133 is mated with the tip 3, is passed through by a conducting metallic fin 134 secured to the composite structure of the blade and projecting outside the rear part of the end face 10 in the direction of the span. After the fin 134 has passed through the slot in the flange 133e and the cap 133 has been engaged on the tip 3 until the flange 133e is applied against the rear part of the end face 10, the portion of the fin 134 projecting outside the flange 133e is advantageously split longitudinally into at least two halves of which one 134a is bent back against the external face of the flange 133e towards the suction face arm 133a and the other 134b towards the pressure face arm 133b. As an alternative, the flange 133e may be full. Thus the cap 133 is anchored mechanically on the composite structure of the blade by the interaction of the fin 134 with the flange 133e.

The diagrammatic sectional view of FIG. 12 clearly shows the bent and riveted structure of the partial end flange 33"e of the alternative form of FIG. 11. This partial flange 33"e comprises a first flap 33"f which is double and extends the part, near the trailing edge 8, of the suction face arm 33"a of the attached cap 33". This first flap 33"f comprises a first part 33"g adjacent to the arm 33"a and which is bent against the rear part of the end face 10 of the blade tip 3 and a second part 33"h which is bent with respect to the first part 33"g to which it is adjacent, and the part 33"h is cranked back and applied against a second flap 33"i which extends the part of the pressure face arm 33"b of the cap 33" which is nearby the trailing edge beyond the end face 10 in the direction of the span. The second part 33"h of the first flap 33"f is then riveted, for example, using two rivets 25, against the second flap 33"i, so that a partial end flange 33"e of substantially z-shaped section is obtained, providing a stiffened connection between the suction face arm 33"a and pressure face arm 33"b and in electrical continuity with them. As far as the rest is concerned, we again see that the suction face arm 33"a and pressure face arm 33"b of the cap 33" have substantially the same shape and straddle the suction face arm 32"a and pressure face arm respectively of the glove 32' in the same way as in the example of FIG. 8.

In the alternative form of FIG. 11a, we again find a conducting fin 234 secured to the composite structure of the blade and projecting in the direction of the span outside the end face 10. However, unlike the fin 134 of FIG. 10a, the fin 234 protrudes from the central part of the face 10 and extends substantially in the chord plane without being bent. Each of the suction face arm 233a and pressure face arm 233b of the cap 233 attached to the tip 3 and in electrical continuity with the leading edge glove 232, like in the preceding examples, is extended on the same side as the face 10 by respectively one of two opposed lugs 235a and 235b, of which one 235a is a suction face lug bent towards the pressure face arm 233b and against the face 10 and the free end part 236a of which is cranked back and applied against the upper face (in FIG. 11a) of the fin 234, while the pressure face lug 235b is bent towards the suction face arm 233a, against the face 10, and its free end part 236b is cranked back and applied against the lower face of the fin 234. The assembly formed by the fin 234 and the two cranked-back parts 236a and 236b is glued with an adhesive, preferably a conducting one, and riveted with at least one rivet 237 making the connection even more conducting. This assembly which protrudes beyond the end face 10 of the blade and provides mechanical anchoring of the cap 233 on the blade tip 3 constitutes a point at which lightning is encouraged to enter or to exit, this protecting the composite structure of the blade against direct strikes without too greatly disrupting the aerodynamic flow, because the fin 234 and the lugs 235a and 235b are placed closer to the trailing edge 8 than to the leading edge of the blade. This fin, when it remains protruding (that is to say outside the theoretical diameter of the rotor defined by the position of the end face of the tip with respect to the centre of the rotor) may serve as an optical identification mark when performing dynamic adjustment, known as "tracking" on the rotor.

A partial end flange, of the same type as the one in FIGS. 10, 10a and 11, is an attractive solution for an attached cap intended to cover the tip of a blade which is truncated along part of the chord, and therefore has a leading edge which is inclined towards the trailing edge and towards the end of the tip, whether this truncated tip be a parabolic tip or one which has a leading edge which is swept back with respect to the leading edge of the main blade section, because balancing screws are not always present.

In the alternative form of FIG. 11b, an intermediate profiled linking piece 58 with a U-shaped section, made of electrically conducting metal or alloy, provides electrical continuity between the cap 333 and the glove 332, as an alternative to the electrical continuity provided directly between cap and glove arranged end to end or one partially straddling the other, as described hereinabove and represented in FIGS. 1 to 11a.

In FIG. 11b, the linking piece 58, on the one hand, is partially covered by the cap 333, similar to the one 33' in FIG. 10 and, on the other hand, partially covers the glove 332 so as to be in electrical continuity with the cap 333 and with the glove 332.

The cap 333 is glued by its suction face arm 333a and pressure face arm 333b against those parts that these cover of the suction face arm 58a and pressure face arm 58b of the linking piece 58, which is glued in the same way by its suction face arm 58a and pressure face arm 58b against those parts which it covers of the suction face arm 332a and pressure face arm 332b of the glove 332. In addition, as in the preceding examples, the cap 333 is glued against the end face 10 of the tip by its rear end flange 333e and against the underlying suction face and pressure face parts of the structure of the blade, as well as the glove 332.

In the regions of overlap between electrically conducting elements, the adhesive is electrically conducting.

Furthermore, rivets 17 may fix the suction face arm 333a and/or pressure face arm 333b of the cap 333 to the covered parts of the suction face arm 58a and/or pressure face arm 58b of the linking piece 58 and at the same time into the underlying structure of the blade, and other rivets 17 may fix the suction face arm 58a and/or the pressure face arm 58b of the linking piece 58 to the covered parts of the suction face arm 332a and/or pressure face arm 332b of the glove 332.

As an alternative, the linking piece 58 may be fixed to the structure of the blade and covered in part by the cap 333 and in part by the glove 332 or alternatively, the linking piece 58 may partially cover the cap 333 and the glove 332, both fixed to the structure of the blade.

Finally, it is possible for the glove to cover part of the linking piece which itself in part covers the cap.

The arms 58a and 58b of the linking piece 58 may have different dimensions in the direction of the chord, in the same way as the arms 332a and 332b of the glove 332, and in that part of the linking piece 58 involved in overlapping with the cap 333, the arms 58a and 58b of the linking piece 58 have dimensions and/or a material section advantageously having the same relationships as those described hereinabove between the arms of the cap and the adjacent parts of the arms of the glove, close to the leading edge.

A blade with swept-back truncated tip is partially and diagrammatically represented in FIG. 13. In this figure, the tip 3' at the external end of the main blade section 1' of the blade has, viewed in plan, the shape of a right-angled trapezium, the inclined side of which constitutes the leading edge of the tip 3' and is swept back by an angle which may be some 45°±15° with respect to the leading edge of the main blade section 1'. As in the preceding examples, dealing with blades with straight tips, two metallic shielding components constitute, in the case of one of them, a leading edge glove 42 and, in the case of the other, a cap 43 for the blade tip 3'. In this example, the glove 42 has suction face and pressure face arms which are symmetrical, that is to say have the same dimensions in the direction of the chord and of the span of the blade or which are asymmetric, when the pressure face arm 43b of the cap 43 is wider, in the direction of the span, than the suction face arm 43a. However, each of the two arms 43a and 43b of the cap 43 comprises a front part 47a or 47b, and inclined intermediate part 48a or 48b, and a straight rear part 49a or 49b. The two front parts 47a and 47b extend in the direction of the span and straddle the end parts respectively of the suction face arm 42a and pressure face arm of the glove 42 or of an intermediate linking piece as far as their internal edge 45a or 45b, the front part 47b also being wider, in the direction of the chord, than the front part 47a. The two intermediate parts 48a and 48b, each swept back at the desired angle in alignment with the corresponding front part 47a or 47b of the suction face arm 43a or pressure face arm of the cap 43, are secured together and adjacent to one another along the inclined leading edge 50 of the cap 43, this leading edge 50 directly covering the one, which has the same shape, of the blade tip 3'. Each of the straight rear parts 49a and 49b which extends the corresponding inclined part 48a or 48b towards the trailing edge 8' of the blade while being substantially perpendicular thereto, or inclined by a small angle (of some 3°) backwards and towards the blade root so as to remain inside the rotor diameter passing through the connection between the parts 48a or 48b and 49a or 49b so as to avoid erosion of a "right" face section, is separated from the other straight rear part by the profiled end face indicated diagrammatically by the arrow 51, of the blade tip 3'. Defined another way, the straight segments 47a, 47b, 48a, 48b and 49a, 49b may be replaced in an equivalent way by a curve.

To fix the cap 43 against this end face 51 of the tip 3', which face has a profiled section which is smaller than that of the main blade section 1' of the blade, it is possible to produce a partial flange with one bent and welded flap or with two flaps one of which is double, bent, cranked back and riveted to the other, as in FIGS. 10 and 11, to link the straight rear part 49a of the suction face arm 43a to the straight rear part 49b of the pressure face arm 43b, this partial flange being fixed to the end face 51 by conductive gluing and by mechanical means such as one or two screws, as in FIGS. 2 and 4, but which does not necessarily fulfil the function of closing a balancing casing, it also being possible for rivets to be used for fixing to the composite structure of the tip 3' the region near the trailing edge 8' of the straight rear parts 49a and 49b of the two arms of the cap 43. The front parts 47a and 47b of this cap 43 are also fixed to the underlying composite structure of the blade tip 3' and to those parts of the arms of the glove 42 which they overlap by conductive gluing and rivets in their region where they straddle the corresponding arms of the glove 42. In addition, each internal edge 46a or 46b of an arm 43a or 43b of the cap 43 have two concave parts with a blend radius, one of which connects the corresponding straight rear part 49a or 49b to the respective inclined part 48a or 48b and the other of which connects this inclined part 48a or 48b to the front part 47a or 47b of the corresponding arm 43a or 43b of the cap 43.

The advantage of this embodiment is that the shielding piece forming the cap 43 has a surface which can be developed, and can therefore be produced by bending from a continuous piece of sheet previously cut to the required dimensions, the other shielding piece, which forms the glove 42, also having a surface which can be developed, and also being able to be produced from a continuous piece of sheet by bending along the leading edge of the main blade section 1' and stretching in order to shape the glove 42, followed by cutting out the contours of the piece, by a laser cutting method or equivalent, to the required dimensions. For the cap 43, folding along its inclined leading edge 50 makes it possible to shape it in its front and inclined parts 47a, 47b and 48*a*, 48*b* and to position its rear parts 49*a* and 49*b* on each side of the end section 51 of the blade tip 3' and in such a way that all that remains is for the two straight rear parts 49*a* and 49*b* to be joined together by the partial flange.

FIGS. 14 and 15 represent an alternative form of cap with a surface which can be developed for a blade with a swept-back truncated tip with leading edge glove having symmetric or asymmetric arms. Another alternative form consists in cutting out the arms 43'*a* and 43'*b* of the cap in such a way that they exhibit the flaps or lug(s) for fixing the cap against the end face of the tip, as in FIG. 10*a* and 11*a*.

FIG. 14 represents the piece of sheet developed, precut to the required dimensions, before the bending for shaping it. FIG. 15 represents the cap 43' shaped by bending and trimming the piece of sheet of FIG. 14.

In FIG. 14, the contours of the piece of sheet laid out flat are substantially in the shape of an inclined "Y". The two branches of the Y, each substantially in the shape of a parallelogram, correspond to the rear parts 49'*a* and 49'*b* respectively of the suction face arm 43'*a* and pressure face arm 43'*b* of the cap 43', developed flat. The stem of the Y essentially consists of the two inclined intermediate parts 48'*a* and 48'*b* of the two arms 43'*a* and 43'*b* of the cap 43', these two parts 48'*a* and 48'*b* being secured together and adjacent to one another along an axis of bending 50' which corresponds to the inclined leading edge of the shaped cap 43'. The stem of the Y is also formed, at the ends of the inclined parts 48'*a* and 48'*b* which are opposite to the rear parts 49'*a* and 49'*b* by the front parts 47'*a* and 47'*b* of the arms 43'*a* and 43'*b*. These front parts 47'*a* and 47'*b*, in this alternative form, have a very limited surface area so that they cover only the outer end of the corresponding leading edge glove or of an intermediate linking piece between the glove and the cap 43'. Each front part 47'*a* or 47'*b* is delimited by an internal edge 45'*a* or 45'*b* so as to straddle the suction face or pressure face arm of the glove or of the intermediate linking piece, and by a front edge 52'*a* or 52'*b* so as to extend in the direction of the leading edge of that end of the glove which is covered by the cap 43' being directly adjacent, after bending, to the other front edge 52'*b* or 52'*a*. The axis of bending 50' passes through the point where the front edges 52'*a* and 52'*b* meet (at the leading edge of the glove) and through the point where the two outer edges 53'*a* and 53'*b* (in the direction of the span of the blade, but inside the branches of the Y before bending) of the rear parts 49'*a* and 49'*b* of the cap 43' meet. The "external" edge 53'*a* of the rear part 49'*a* has, projecting towards the inside of the Y, near to its trailing edge 54'*a*, a double flap 55'*a* with a part 56'*a* which is triangular and adjacent to the rear part 49'*a* and with a part 57'*a* which is trapezoidal and adjacent to the triangular part 56'*a* and pierced with an orifice for at least one fixing rivet. In register with this, the "external" edge 53'*b* of the other rear part 49'*b* has, projecting towards the inside of the Y, close to its trailing edge 54'*b*, a trapezoidal flap made of a single component 55'*b*. Each of the rear parts 49'*a* and 49'*b* also have, close to its trailing edge 54'*a* or 54'*b*, at least two holes for the passage of rivets. Likewise, the front parts 47'*a* and 47'*b* each have at least two holes for the passage of rivets. By bending about the axis 501, the (widest in the direction of the chord) pressure face arm 43'*b* of the cap 43' is folded under its suction face arm 43'*a*, and this shapes the front and inclined parts 47'*b* and 48'*b* under the front and inclined parts 47'*a* and 48'*a* of the suction face arm 43'*a* of the cap 43'. At the same time, the rear parts 49'*a* and 49'*b* are arranged substantially in line with one another. The part 56'*a* of the flap 55'*a* may be folded down perpendicular to the plane of FIG. 14, and the other part 57'*a* of this same double flap 55'*a* can then be bent so as to be applied against the flap 55'*b* of the other rear part 49'*b*. In that way, by fitting at least one rivet securing these two flaps 55'*a* and 55'*b* together, a partial flange is produced which connects the two rear parts 49'*a* and 49'*b*, which may be fixed by two rivets at their trailing edge 54'*a* and 54'*b* after placing on the basic composite structure of a blade with sweptback truncated tip, as in FIG. 13, or with the slight inclination backwards and towards the blade root so that it remains within the diameter of the rotor passing through the connection between the parts 48*a* or 48*b* and 49*b* or 49*b*. Likewise, two rivets make it possible to fix each of the front parts 47'*a* and 47'*b* on the underlying composite structure of the blade and on the portion that it covers of the suction face or pressure face arm of the corresponding glove.

It is thus possible in a simple way to produce a cap which is attached to the blade tip and to the outer end of the leading edge glove or possibly via a conducting linking piece, so as to obtain shielding for enhanced protection against lightning with a blade tip cap and preferably also a leading edge glove each of which has asymmetric suction face and pressure face arms.

Such a cap may be produced for any blade end, including ends which have forms which cannot be developed (parabolic for example) by operations of pressing, electroforming and/or plastic stretching, the leading edge of the cap being manufactured using operations of bending (of a sheet or laminate of titanium for example), of stretch forming or punching, and cutting to the final contour.

We claim:

1. A blade comprising shielding for enhanced protection against lightning for a rotorcraft rotor;

said blade comprising a composite structure of composite material synthetic matrix and reinforcing fibers, said composite structure comprising a profiled main blade section delimited between a section face surface and a pressure face surface which extend, in a direction of a chord of the blade, between a leading edge and a trailing edge and, in a direction of a span of the blade, between a blade tip at one end of said main blade section and a blade root which extends an opposite end of said main blade section and which includes means for attaching the blade to a rotor hub;

said shielding for protection against lightning comprising:

a glove for protecting the leading edge, said glove being metallic, electrically conducting, and comprising a suction face arm and a pressure face arm which are adjacent along the leading edge and which are fixed to underlying parts of the suction face surface and the pressure face surface;

a cap for protecting the blade tip, said cap being distinct from the glove and attached to the blade in such a way as to cover at least an end of the blade tip and being metallic, electrically conducting, and comprising a suction face arm and a pressure face arm which extend over substantially an entire end chord of the blade tip and which are applied to underlying parts of the suction face surface and the pressure face surface, respectively, in a region of the blade tip, the cap being connected with electrical continuity to the glove and electrically conducting means on the blade root for providing electrical continuity between the glove and electrically conducting means of said hub, for earthing the shielding, wherein at least the cap comprises a suction face arm having dimensions, at least in the direction of its span, which are different from dimensions of its pressure face arm.

2. A blade according to claim 1, wherein the glove has a suction face arm a pressure face arm which have substantially identical dimensions, at least in a direction of a chord of the blade.

3. A blade according to claim 1, wherein the glove has a suction face arm having dimensions, at least in a direction of a chord of the blade, which are different from dimensions of its pressure face arm.

4. A blade according to claim 1, wherein at least one of said suction face arm and said pressure face arm of the cap has at least one member selected from the group consisting of a dimension and a material section in a direction of the span which is larger in a region near the leasing edge than in a region near the trailing edge.

5. A blade according to claim 4, wherein at least one of said suction face arm and said pressure face arm of the cap has at least one member selected from the group consisting of a dimension and material section, in the direction of the span, which reduces substantially progressively from a region near the leading edge to a region near the trailing edge, and then which increases in a region directly adjacent to the trailing edge as far as the latter.

6. A blade according to claim 1, wherein at least one of said suction face arm and said pressure face arm of the cap has, in a region near the leading edge, at least one member selected from the group consisting of a dimension and material section in the direction of the span which is not substantially smaller than said at least one member selected from the group consisting of a dimension and material section in the direction of the chord of the adjacent region of a corresponding member selected from the group consisting of the suction face arm and the pressure face arm of the glove.

7. A blade according to claim 1, wherein at least one of the suction face arm and the pressure face arm of the cap has, in its region near the leading edge, an edge extending over a corresponding member selected from the group consisting of the suction face surface and the pressure face surface and which has a concave part, with a blend radius, substantially extended by a corresponding edge of the corresponding at least one member selected from the group consisting of the suction face arm and, the pressure face arm of the glove.

8. A blade according to claim 1, wherein at least one of the suction face arm and the pressure face arm of the cap has, at least in its region near the leading edge, a developed transverse section which is at least equal to that of the corresponding at least one member selected from the group consisting of the suction face arm and the pressure face arm of the glove in its region adjacent to the cap.

9. A blade according to claim 1, wherein edges of the suction face arm and the pressure face arm of the cap which extend over said suction face surfaces and said pressure face surfaces evolve parallel to one another but are offset one with respect to the other in the direction of the span of the blade, following a line selected from the group consisting of a line forming a polygon and a curved line.

10. A blade according to claim 1, wherein the blade tip is truncated along at least part of the chord and has a leading edge inclined towards the trailing edge and towards the end of the blade tip and along which its suction face arm and the pressure face arm are adjacent and secured together.

11. A blade according to claim 1, wherein said cap is fixed against at least an end face of said composite structure in a region of said blade tip with aid of fixing means which are electrically conducting at least in part.

12. A blade according to claim 11, wherein the fixing means comprise at least one adhesive, for glueing the cap against at least part of a member selected from the group consisting of the end face of the blade tip, at least one of said suction face surface and said pressure face surface of the composite structure, at least part of the glove, and an intermediate linking piece glued against at least part of the glove.

13. A blade according to claim 11, wherein said fixing means comprise mechanical means having protruding shapes, constituting predetermined points for lightning to strike or to exit, placed in electrical continuity with said cap.

14. A blade according to claim 13, wherein said mechanical fixing means comprise at least one screw for effecting at least one function selected from the group consisting of balancing and closing a housing of at least one member selected from the group consisting of a balancing weight and a dynamic-adjustment weight and which is screwed in a region of said end face of the blade tip which is closer to said leading edge than to the trailing edge.

15. A blade according to claim 14, wherein said screw fixes against said end face of the blade tip at least one cap lug which extends at least one of said suction face arm and said pressure face arm of said cap and is bent with respect to said suction face arm and pressure face arm of the cap.

16. A blade according to claim 14, wherein said screw fixes against said end face of the blade tip and electrically conducting end flange of the cap, connecting said suction face arm and pressure face arm of the cap and extending over substantially the entire section of said end face.

17. A blade according to claim 12, wherein said cap comprises an electrically conducting partial end flange, said partial end flange connecting the suction face arm and pressure face arm of the cap with which each said arm said partial end flange is in electrical continuity, and extending over a part of the section of said end face which is adjacent to said trailing edge.

18. A blade according to claim 17, wherein said partial end flange comprises at least one cap flap which extends at least one of said suction face arm and said pressure face arm of the cap and is bent against said end face part adjacent to the trailing edge, said flap being fixed, to the other of said at least one of said suction face arm and said pressure face arm of the cap.

19. A blade according to claim 17, wherein said partial end flange comprises at least one double cap flap which extends at least one of said suction face arm and said pressure face arm of the cap, and of which a first part, adjacent to said at least one of said suction face arm and said pressure face arm of the cap is bent against said end face part adjacent to the trailing edge, whereas the second part of a double flap, adjacent to the first part thereof is cranked with respect to the first part of said double flap and fixed, against a second flap extending the other of said suction face arm and said pressure face arm of the cap and projecting in the direction of the span beyond said end face of the blade tip.

20. A blade according to claim 1, wherein the cap includes an electrically conducting at least partial end flange in electrical continuity with the suction face arm and the pressure face arm of the cap and pierced with at least one slot through which at least one electrically conducting fin secured to the composite structure of the blade and projecting in the direction of the span towards the outside of the blade tip passes, wherein a portion of the fin which projects outside the flange is bent, at least in part against said flange so as to keep the flange applied against the end face of the blade.

21. A blade according to claim 1, wherein the composite structure of the blade is extended, in the direction of the span and projecting outside the blade tip, by at least one electrically conducting fin secured to said composite structure and against two opposed faces of which there are fixed, cranked parts of at least two lugs bent against the end face of the blade tip and each secured, respectively, to one of the suction face arm and the pressure face arm of the cap.

22. A blade according to claim 13, wherein said mechanical fixing means comprise at least one rivet fixing at least one of said suction face arm and said pressure face arm of said cap against at least one member selected from the group consisting of said suction face arm and said pressure face arm of said glove, and the intermediate linking piece, and against at least one of said suction face surface and said pressure face surface in the region of the blade tip, in a region selected from the group of regions consisting of a region near the trailing edge and a region near the leading edge.

23. A blade according to claim 1, wherein said electrically conducting means of said root, in order to provide electrical continuity between the glove and the hub, comprise at least one member selected from the group consisting of one tape and a braid which is metallic and electrically conducting extending from one end of said glove which is closest to said blade root as far as a fixed point of said root and fixed thereto.

24. A blade according to claim 1, wherein said electrically conducting means of said blade root, in order to provide electrical continuity between the glove and the hub, comprise a continuous extension of said glove which protects part of said blade root coming into alignment with the leading edge as far as close to said blade attachment means, said extension of the glove being fixed at least at one point against said blade root by at least one member selected from the group consisting of mechanical fixing means and adhesive.

25. A blade according to claim 1, wherein said blade attachment means comprise, on the blade root, at least one metallic and electrically conducting attachment bushing, wherein said at least one metallic and electrically conducting attachment bushing of said blade root, in order to provide electrical continuity between the glove and the hub, comprise a continuous extension of said glove which extends as far as being in direct connection with said attachment bushing.

26. A blade according to claim 1, wherein said cap has a trailing end which protrudes projecting beyond said trailing edge of the blade.

27. A blade according to claim 1, in which the reinforcing of said composite structure comprise carbon fibers, and wherein, at least between said main blade section and said glove for the leading edge, an underlying dielectric composite glove with a synthetic matrix and reinforcing fibers of glass insulates the glove for the leading edge from said composite structure.

28. A blade according to claim 1, wherein the cap comprises a material of the same nature as material of the glove.

* * * * *